United States Patent Office 3,323,994
Patented June 6, 1967

3,323,994
5 - IODOURACIL - 2' - DESOXYRIBOSIDE - 3',5' - DIESTERS AND PROCESS FOR PREPARING THEM
Horst Grötsch, Frankfurt am Main, Germany, assignor to Farbwerke Hoechst Aktiengesellschaft vormals Meister Lucius & Brüning, Frankfurt am Main, Germany, a corporation of Germany
No Drawing. Filed Sept. 11, 1964, Ser. No. 395,896
Claims priority, application Germany, Sept. 12, 1963, F 40,740
6 Claims. (Cl. 167—59)

The present invention provides 5-iodouracil-2'-desoxyriboside-3',5'-diesters (IDU-esters) and a process for preparing them.

It is known that 5-iodouracil-2'-desoxyriboside-3',5'-diacetate (IDU-acetate) may be used for the treatment of herpes corneae simplex. In tests carried out with this compound, we have made the observation that this compound is very sparingly soluble in oil and that, therefore, it is not suitable for galenic preparations. In addition thereto, the compound has a certain irritative action which is disadvantageous, especially when used for the treatment of the eyes.

It is an object of the present invention to provide new 5-iodouracil-2'-desoxyriboside-3',5'-diesters which do not possess the disadvantageous properties described above of IDU-diacetate.

It is a further object of the present invention to provide a process for preparing the 5-iodouracil-2'-desoxyriboside-3',5'-diesters.

According to the invention, the new 5-iodouracil-2'-desoxyriboside-3',5'-diesters are prepared by reacting 5-iodouracil-2'-desoxyriboside with anhydrides or halides of aliphatic carboxylic acids that have 3 or more carbon atoms or of aromatic carboxylic acids, in the presence of a base. This process permits the preparation of the new substances in simple manner and with good yields.

As starting materials, there may be used the anhydrides or halides of aliphatic carboxylic acids having at least 3 carbon atoms or of aromatic carboxylic acids, for example, those of propionic acid, butyric acid, valeric acid, isobutyric acid, isovaleric acid or benzoic acid. As acid halides, there are suitable for the process of the present invention in the first instance the acid bromides and, preferably, the acid chlorides.

As bases, there may be used any basic substances which are capable of binding the acid set free during the reaction. In practice, one will adapt the base to the acid which will be set free. Thus, for example, if the reaction is carried out with acid halides and hydrohalic acid is set free during the reaction, alkali metal hydroxides such as sodium hydroxide or potassium hydroxide will be used; if the reaction is carried out with acid anhydrides, organic bases, in particular tertiary nitrogen bases such as pyridine, quinoline or trialkylamine, will be used. In case organic bases are used, it is recommended to operate with exclusion of water.

The reaction is suitably carried out at temperatures in the range of 0° and 40° C., preferably at room temperature, i.e. in a temperature range of from about 10° to 25° C.

The new desoxyriboside esters are very important for the virus chemotherapy in the treatment of herpes corneae simplex and keratitis disciformis. They are distinguished by a good solubility in fat and show a good long lasting depot effect when used in ointments for the eyes or in oily preparations. Compared with the known IDU-diacetate, the products of the present invention offer the advantage of being much better tolerated. Therapeutic preparations contain 0.1–0.5% of the compound, for ointments there are preferably chosen concentrations of 0.1–0.2% and for oily preparations, there are chosen concentrations of 0.1–0.3%.

The following example illustrates the invention, but it is not intended to limit it thereto:

EXAMPLE

5-iodouracil-2'-desoxyriboside - 3',5' - diesters are prepared by the reaction of 0.01 mol of 5-iodouracil-2'-desoxyriboside in 10 ml. of anhydrous pyridine with 32 ml. of acid anhydride at 15–20° C., with exclusion of moisture and with stirring, in the course of 8–16 hours. Pyridine and, in the case of low molecular carboxylic acids, even the excess acid (or the excess acid anhydride) are evaporated from the clear solution by repeated addition of methanol. The residue is dissolved in 50 ml. of methanol and the reaction product is precipitated by the addition of 200 ml. of water. It separates in solid form or in the form of an oil. By repeated re-precipitation from methanol and water or a solution of sodium bicarbonate, pyridine and acid residues are removed. In this manner, there are first obtained oily products which, if this is desired or required, may be recrystallized from methanol or other solvents.

According to this method, there were obtained:

| | Yield, percent | Melting Point |
|---|---|---|
| (1) IDU-3',5'-di-propionate | 87 | 98–100° C. (from ethyl acetate). |
| (2) IDU-3',5'-di-butyrate | 95 | 124° C. (from methanol). |
| (3) IDU-3',5'-di-isobutyrate | 90 | 128° C. (from ethyl acetate and petroleum ether). |
| (4) IDU-3',5'-di-valerate | 90 | 95° C. (from methanol and water). |
| (5) IDU-3',5'-di-isovalerate | 90 | Oil. |
| (6) IDU-3',5'-di-benzoate | 55 | 187° C. (from ethyl acetate). |

For preparing oily preparations, the IDU-esters are dissolved with shaking at room temperature in castor oil or sesame oil. Under such conditions, the known IDU-diacetate dissolves in the course of 7 days, the IDU-dipropionate in 7 hours, the IDU-di-butyrate in 12 hours, the IDU-di-isobutyrate in 24 hours and the IDU-di-isovalerate in 2 hours.

We claim:
1. A 5-iodouracil-2'-desoxyriboside-3',5' - diester the ester components of which are members selected from the group consisting of aliphatic acylates having 3–5 carbon atoms and benzoates.
2. 5-iodouracil-2'-desoxyriboside-3',5'-di-propionate.
3. 5-iodouracil-2'-desoxyriboside-3',5'-di-butyrate.
4. 5-iodouracil-2'-desoxyriboside-3',5'-di-valerate.
5. A method for treating herpes corneae simplex and keratitis disciformis, which comprises administering to the mucous membrane of the eye an effective dose of a 5-iodouracil-2'-desoxyriboside-3',5'-diester whose ester components are members selected from the group consisting of aliphatic acylates having 3–5 carbon atoms and benzoates.
6. 5-iodouracil-2'-desoxyriboside-3',5'-dibenzoate.

References Cited

UNITED STATES PATENTS 3,002,965 10/1961 Fox et al. _____ 260—211.5
3,221,010 11/1965 Duschinsky _____ 260—211.5

FOREIGN PATENTS 1,336,866 7/1963 France.

OTHER REFERENCES

British Med. Journal, Dec. 8, 1962, p. 1515–16.

LEWIS GOTTS, *Primary Examiner.*
P. A. STITH, JOHNNIE R. BROWN,
*Assistant Examiners.*